(12) United States Patent
Buerger et al.

(10) Patent No.: US 11,198,214 B2
(45) Date of Patent: Dec. 14, 2021

(54) METHOD FOR OPERATING A ROBOT IN A MULTI-AGENT SYSTEM, ROBOT AND MULTI-AGENT SYSTEM

(71) Applicant: Robert Bosch GmbH, Stuttgart (DE)

(72) Inventors: Mathias Buerger, Stuttgart (DE); Philipp Christian Schillinger, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 16/393,318

(22) Filed: Apr. 24, 2019

(65) Prior Publication Data
US 2019/0351542 A1    Nov. 21, 2019

(30) Foreign Application Priority Data
May 15, 2018    (DE) .......................... 102018207539.5

(51) Int. Cl.
*B25J 9/00*    (2006.01)
*B25J 9/16*    (2006.01)

(52) U.S. Cl.
CPC ........... *B25J 9/0084* (2013.01); *B25J 9/1664* (2013.01); *G05B 2219/50391* (2013.01)

(58) Field of Classification Search
CPC .............. B25J 9/0084; B25J 9/1664; G05B 2219/50391; G05B 2219/39146;
(Continued)

(56) References Cited

U.S. PATENT DOCUMENTS

| 6,415,274 B1 * | 7/2002 | Goldsmith | ............. G06F 9/465 706/45 |
| 7,171,441 B2 * | 1/2007 | Shiouchi | ............. H04L 63/0823 709/202 |

(Continued)

OTHER PUBLICATIONS

Koenig et al, The Power of Sequential Single-Item Auctions for Agent Coordination, AAAI, Proceedings of the National Conference on Artificial Intelligence—AAAI 2006, Jan. 1, 2006, (Jan. 1, 2006), pp. 1625-1629, XP055574443 (Year: 2006).*

(Continued)

*Primary Examiner* — Jaime Figueroa
(74) *Attorney, Agent, or Firm* — Norton Rose Fulbright US LLP; Gerard Messina

(57) ABSTRACT

A method for operating a multi-agent system that includes multiple robots, each of the robots cyclically performing the following: starting from an instantaneous system state, ascertaining possible options, the options defining actions by which a transition may be achieved from an instantaneous system state to a subsequent system state; for each of the possible options, ascertaining action costs for performing an action specified by the option; performing an auction, the action costs values ascertained for each option being taken into consideration by each of the other robots; and performing an action, which corresponds to one of the options, as a function of all cost values ascertained or received for the relevant option, the action costs for a particular option each taking an experience parameter into consideration, which is a function of costs for past actions assigned to the particular option previously carried out by the multiple robots.

15 Claims, 4 Drawing Sheets

(58) Field of Classification Search
CPC ............. G05D 1/0217; G05D 2201/02; G05D 1/0291; G05D 1/0287
USPC .................................................. 700/245–264
See application file for complete search history.

(56) References Cited

U.S. PATENT DOCUMENTS

| | | | | |
|---|---|---|---|---|
| 7,194,337 | B2* | 3/2007 | Sharma | G05D 23/1931 156/200 |
| 8,112,176 | B2* | 2/2012 | Solomon | G05D 1/0088 700/245 |
| 9,311,670 | B2* | 4/2016 | Hoffberg | G06Q 30/08 |
| 9,733,646 | B1* | 8/2017 | Nusser | B65G 1/137 |
| 2001/0042123 | A1* | 11/2001 | Moody | G06F 9/4875 709/226 |
| 2004/0162638 | A1* | 8/2004 | Solomon | F41H 13/00 700/247 |
| 2005/0005272 | A1* | 1/2005 | Moody | G06Q 10/06 718/104 |
| 2010/0280631 | A1* | 11/2010 | Lu | G06N 3/002 700/21 |
| 2015/0148951 | A1* | 5/2015 | Jeon | G05D 1/0219 700/248 |
| 2016/0129592 | A1* | 5/2016 | Saboo | B25J 5/007 700/248 |
| 2018/0326581 | A1* | 11/2018 | Baroudi | G06N 3/008 |

OTHER PUBLICATIONS

Zhang et al, Comparison of Auction-based Methods for Task Allocation Problem in Multi-robot Systems, IEEE, Proceeding of the IEEE International Conference on Robotics and Biomimetics (ROBIO), Shenzhen, China, Dec. 2013, pp. 2609-2613 (Year: 2013).*

Lacerda et al, Optimal and Dynamic Planning for Markov Decision Processes with Co-Safe LTL Specifications, IEEE/RSJ International Conference on Intelligent Robots and Systems (IROS 2014), Sep. 14-18, 2014, Chicago, IL, USA, pp. 1511-1516 (Year: 2014).*

Sariel et al, Real Time Auction Based Allocation of Tasks for Multi-Robot Exploration Problem in Dynamic Environments, ResearchGate, Jan. 2005, pp. 1-7 (Year: 2005).*

P. Schillinger, et al., "Auctioning Over Probabilistic Options for Temporal Logic-Based Multi-Robot Cooperation Under Uncertainty", IEEE International Conference On Robotics and Automation, 2018.

* cited by examiner

METHOD FOR OPERATING A ROBOT IN A MULTI-AGENT SYSTEM, ROBOT AND MULTI-AGENT SYSTEM

RELATED APPLICATION INFORMATION

The present application claims priority to and the benefit of German patent application no. 102018207539.5, which was filed in Germany on May 15, 2018, the disclosure of which is incorporated herein by reference.

FIELD OF THE INVENTION

The present invention relates to multi-agent systems and, in particular, to methods for controlling robots of a multi-agent system by distributing tasks with the aid of a cooperative auction method.

BACKGROUND INFORMATION

The coordination of a team of robots for jointly accomplishing a task is difficult, in particular, in the case of uncertainties of the conditions of the surroundings, as well as in the case of time dependencies in the task specification. The segmenting of the task specification into subtasks requires suitable mechanisms for segmenting the task specification, whereby the handling instructions for the individual robots, in particular, may not be satisfactorily assigned due to the uncertainties of the real surroundings.

In order to represent chronological dependencies between individual actions of robots, a description language, the so-called linear temporal logic (LTL) is known, which represents a task specification in the form of an LTL specification. From the LTL specification, it is possible to derive action plans, i.e., a set of action instructions for the individual robots, in a known manner.

LTL for robot applications enables chronological boundary conditions to be integrated into probabilistic models, in particular, with Markov decision processes (MDP). Markov decision processes enable uncertainties to be represented, including unknown periods of time for carrying out actions and stochastic events in the surroundings.

In order to develop action instructions under uncertainty for LTL task specifications, a planning for an individual robot may be provided, which combines an automaton representation of the task specification with a Markov decision process. Action instructions for individual robots may also be planned in order to maximize a benefit of an LTL task description.

Auction methods are generally known for coordinating multiple robots separately from a specific model. P. Schillinger, et al., "Auctioning over Probabilistic Options for Temporal Logic-Based Multi-Robot Cooperation under Uncertainty", IEEE International Conference on Robotics and Automation, 2018, describes a method for coordinating a team of robots to perform a shared task. In this method, chronological dependencies and uncertainties of the surroundings may be taken into consideration. The method described enables uncertainties and observations to be taken into consideration as the task is carried out by carrying out a task distribution with the aid of an auction method.

Efficient planning algorithms for coordinating robots of a multi-agent system in non-deterministic surroundings for solving tasks with chronologically dependent specifications are at present unknown.

SUMMARY OF THE INVENTION

According to the present invention, a method for operating a robot in a multi-agent system according to the description herein, as well as a robot and a multi-agent system according to the further descriptions herein are provided.

Additional embodiments are specified in the further descriptions herein.

According to a first aspect, a method is provided for operating a multi-agent system using multiple robots, each of the robots cyclically carrying out the following method:
  starting from an instantaneous system state, ascertaining possible options, the options defining actions by which a transition may be achieved from an instantaneous system state to a subsequent system state;
  for each of the possible options, ascertaining action costs for carrying out an action specified by the option;
  carrying out an auction, the action costs values ascertained for each option being taken into consideration by each of the other robots; and
  carrying out an action, which corresponds to one of the options, as a function of all cost values ascertained or received for the relevant option, the action costs for a particular option each taking one of the experience parameters into consideration, which is a function of costs for past actions assigned to the particular option previously carried out by the multiple robots.

One idea of the above method for operating a multi-agent system that includes multiple robots (agents) is to provide a deterministic finite automaton, which defines the task specification to be solved by a multi-agent system. The deterministic finite automaton includes multiple system states, which define one or multiple state paths that must be passed through for achieving the task goal. In this deterministic, finite automaton, the state transitions are assigned to various robots in an auction procedure. The state transitions that may be carried out by a robot are referred to below as options.

In the process of assigning the state transitions to be carried out to individual robots, subtasks that result in state changes may be assigned as options to the individual robots. Such an auction method enables a subtask to be assigned with the aid of a suitable cost function to those robots which are able to carry out the relevant subtask with minimum costs. A cost function may take into consideration, in particular, the time expenditure for carrying out the relevant subtask, as well as the probability that carrying out the subtask fulfills the defining condition for the system state.

If a system state condition for a system change is fulfilled by the subtask, then all ongoing subtasks of the robots are interrupted and a renewed auction is carried out, in which new options are then distributed to the robots. The new options in this case correspond to the relevant state transitions originating from the system state now reached. This method is carried out until the target state is reached. In this way, it is possible to efficiently carry out a distribution of subtasks in a multi-agent system, wherein chronological dependencies, in particular, may be particularly efficiently taken into consideration.

By prescribing the deterministic, finite automaton to all robots, each robot is able to ascertain its options in a distributed manner with respect to the primary task objective, a much less complex probabilistic planning problem having to be solved. As a result of the decentralized auction scheme, the various options are assigned to various robots, the provided auction algorithm enabling the robots to carry out subtasks, which are chronologically a function of other subtasks. With each performance of a subtask, the method is carried out again, so that the knowledge about system states may be instantaneously taken into consideration.

The above method further enables a straightforward implementation, since robots, in particular, do not have to be assigned subtasks in advance. On the whole, the decentralized method of coordinating multiple robots in system surroundings subject to uncertainties enables the implementation of a predefined task specification, for example, in the form of a Linear Temporal Logic (LTL), in particular, a Co-Safe LTL.

The above method efficiently enables the supplementation of a multi-agent system to be coordinated, in particular, with uncertainties of the surroundings conditions. This applies, in particular, for specifications that include chronological logic, which are to be processed by the entire team of robots. For this purpose, the robots are automatically assigned subtasks of the task specification. The conditions of the system surroundings may also be taken into consideration by regularly updating the planned action instructions, so that the robots are able to flexibly adapt to the uncertainties.

An action which corresponds to one of the options may also be carried out if an intrinsic cost value, which indicates the minimum costs of all costs values received for the corresponding option, is ascertained for the corresponding option.

It may also be provided that no action is carried out, which corresponds to one of the options if no intrinsic cost value, which indicates the minimum costs of all costs values received for the corresponding option, is ascertained for any of the options.

Furthermore, the experience parameter may be a function of the distribution of the physical start states of the relevant robots when the action to be carried out by the option is started.

According to one specific embodiment, the experience parameter may be ascertained by solving a shortest path problem.

It may be provided that the experience parameter is updated upon termination of the action associated with an option by ascertaining the costs for carrying out the action by the relevant robot, and the experience parameter being adapted as a function of the ascertained costs and, in particular, as a function of an adaptation parameter, which decreases, in particular, for higher k.

It may be provided that the cost value for an option as a function of a period of time for carrying out the action assigned to the option and/or of a probability that when the action assigned to the option is carried out, a state condition for reaching the system state to which the option leads, is ascertained.

In particular, a probability that when carrying out an action assigned to the option, a state condition for reaching the system state is reached, may be updated as the action is carried out.

According to one specific embodiment, the progress along the path of the system states of the deterministic, finite automaton may be achieved if there is no possibility that one of the preceding system states is reachable by fulfilling a condition of the subsequent system state, the system states, in particular, being assigned levels of progress, which indicate the progress along the path of the system states of the deterministic, finite automaton.

It may be provided that the system state reached is conveyed to the other robots when an action is terminated.

It may be provided that an implementation of an action is interrupted or terminated if a piece of information about the reaching of a subsequent system state is received.

Furthermore, the cost values ascertained for each option may be provided via explicit communication of costs by each of the other robots.

According to another aspect, a robot is provided for operating a multi-agent system, the robot being configured to cyclically carry out the following steps:
  starting from an instantaneous system state, ascertaining possible options, the options defining actions by which a transition from an instantaneous system state to a subsequent system state may be achieved;
  for each of the possible options, ascertaining action costs for carrying out an action specified by the option;
  carrying out an auction, the action costs ascertained for each option being taken into consideration by each of the other robots; and
  carrying out an action that corresponds to one of the options, as a function of all cost values ascertained and received for the relevant option,
  the action costs for a particular option each taking one of the experience parameters into consideration, which is a function of the costs for past actions assigned to the particular option previously carried out by the multiple robots.

According to another aspect, a multi-agent system that includes multiple of the above robots is provided.

Specific embodiments are explained in greater detail below with reference to the appended drawings.

DETAILED DESCRIPTION

Figure 1:
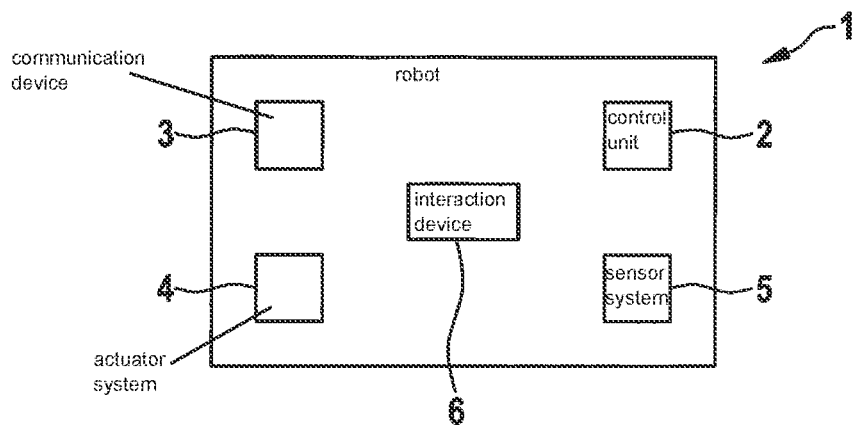
FIG. 1 schematically shows a representation of a robot of a multi-agent system.

A method is described below, with which in a multi-agent system agents are provided as robots interacting with the surroundings. Robots 1 have a configuration as it is schematically depicted in FIG. 1. Robots 1 also each include a control unit 2, which is configured to carry out subtasks. To communicate with other robots 1, each of robots 1 further includes a communication device 3 in order to transmit pieces of information to, and to receive pieces of information from, other robots 1.

Robot 1 may interact with the system surroundings with the aid of an actuator system 4. Actuator system 4 may, for example, include a movement actuator system, a gripping actuator system and the like, which are operated in a manner known per se in accordance with the subtask assigned to robot 1. As a result, robot 1 is able, in particular, to move around, pick up and set down objects and the like.

Surroundings states may also be detected with the aid of a sensor system 5. Sensor system 5 may include, for example, a camera, other sensor systems usable for object detection such as, for example, an ultrasonic sensor system and the like. With the aid of the camera, it is possible to recognize and identify positions of objects with which interaction may/is to take place, and to enable a movement within the system surroundings, objects that represent obstacles being circumnavigated.

Furthermore, robots 1 may also be provided with an interaction device 6 such as, for example, a touch display or a speech input/output device, in order to communicatively interact with objects or persons in the surroundings. In this way, persons may enter inputs to robots 1 and obtain pieces of information.

The point of departure of the method described below is a task specification in the form of a Linear Temporal Logic (LTL), in particular, a co-safe Linear Temporal Logic (scLTL). This represents a description language for a task specification of a task to be solved, which includes chronological modalities. Each scLTL task specification may be translated into a deterministic finite automaton (DEA).

Figure 2:
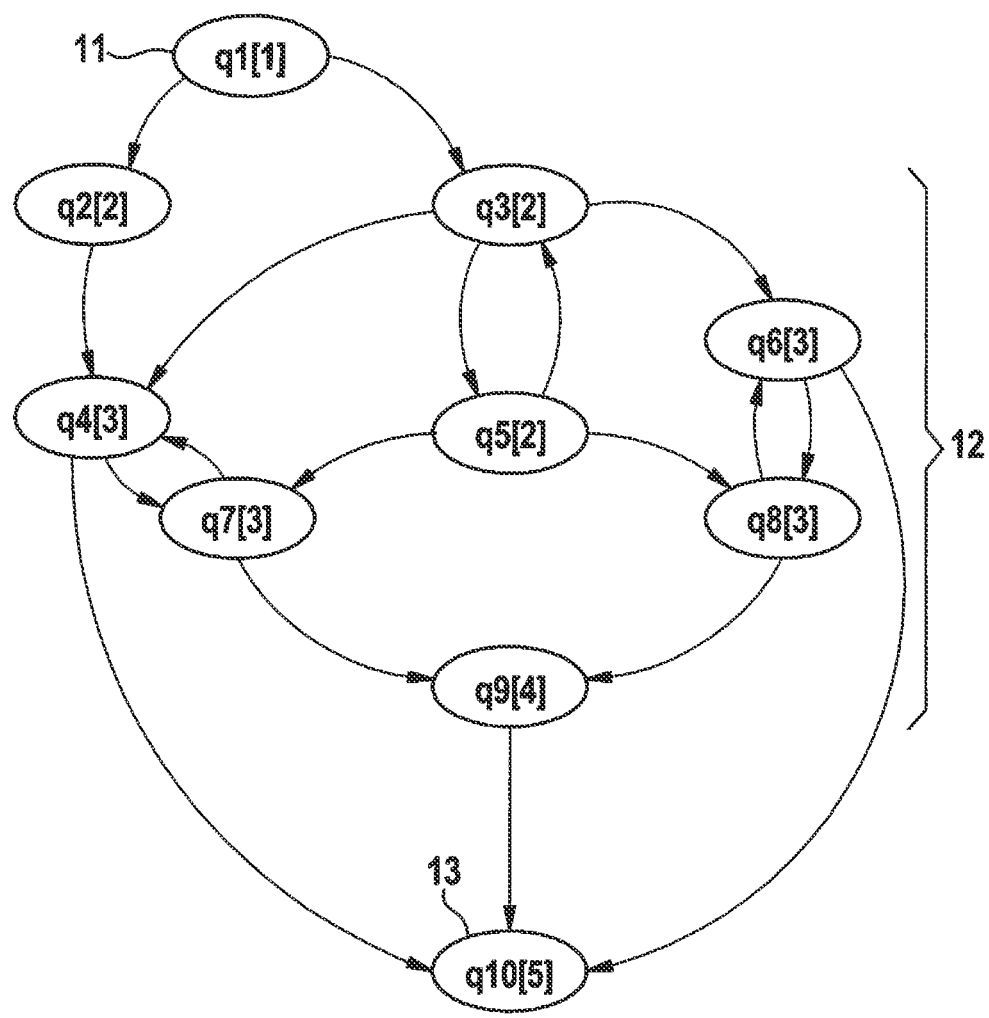
FIG. 2 shows a representation of a deterministic, finite automaton.

Such a deterministic finite automaton (DEA) is depicted by way of example in FIG. 2. FIG. 2 shows system states (q1 through q10), which include a start state 11 (q1), multiple intermediate states 12 (q2 through q9) and one or multiple target states 13 (q10). Arrows in the chart for representing the deterministic finite automaton show state transitions from start state 11 (q1) to target state 13 (q10) along one or multiple paths. A system state is reached if a state condition assigned to the relevant system state is fulfilled. The system states from start state 11 to target state 13 are reached by progressing along a path. Progress along a path is achieved if there is no possibility of a return path from one system state to a following system state. Progress along the paths is indicated by levels of progress, in particular, ascending levels of progress.

Figure 3:
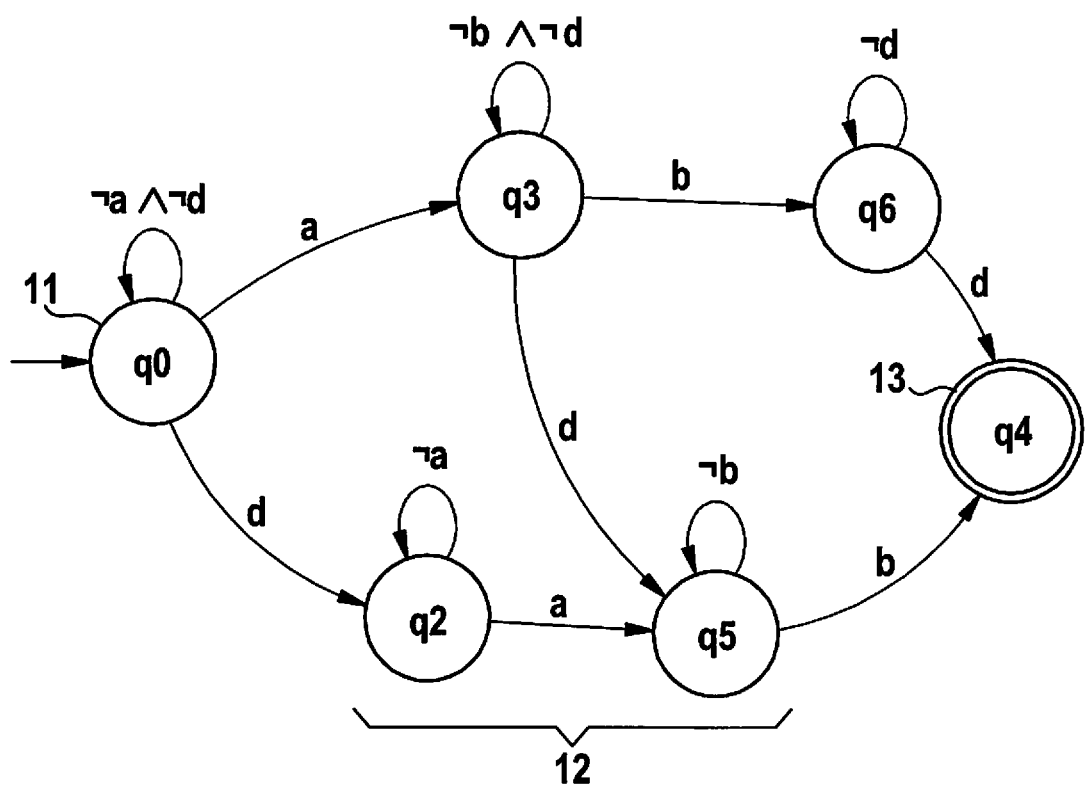
FIG. 3 shows a representation of a cyclical, finite automaton.

FIG. 3 schematically shows a representation of a cyclical finite automaton, including system states q0, q2, q3, q5, q6, and q4, which is suitable for describing repeating cyclical tasks. In FIG. 3, system states q2, q3, q5, q6 are intermediate states 12. The cyclical finite automaton may be part of a finite automaton or may represent the latter. A cyclical finite automaton is distinguished, in particular, by the fact that when the target state has been reached (q4) 13, the target state is then reset to an earlier state, for example, to start state (q0) 11. Unless indicated otherwise below, the terms deterministic finite automaton and cyclical finite automaton may be understood to be equivalent for the described method. The depicted cyclical finite automaton corresponds to the following LTL formula:

$$\phi = \Diamond(a \wedge \Diamond b) \wedge \Diamond d$$

A method for assigning options to individual robots 1 in a cyclical finite automaton is described below. The assignment of options in a non-cyclical part of the deterministic finite automaton may be carried out by the same method or by a method differing therefrom.

Figure 4:
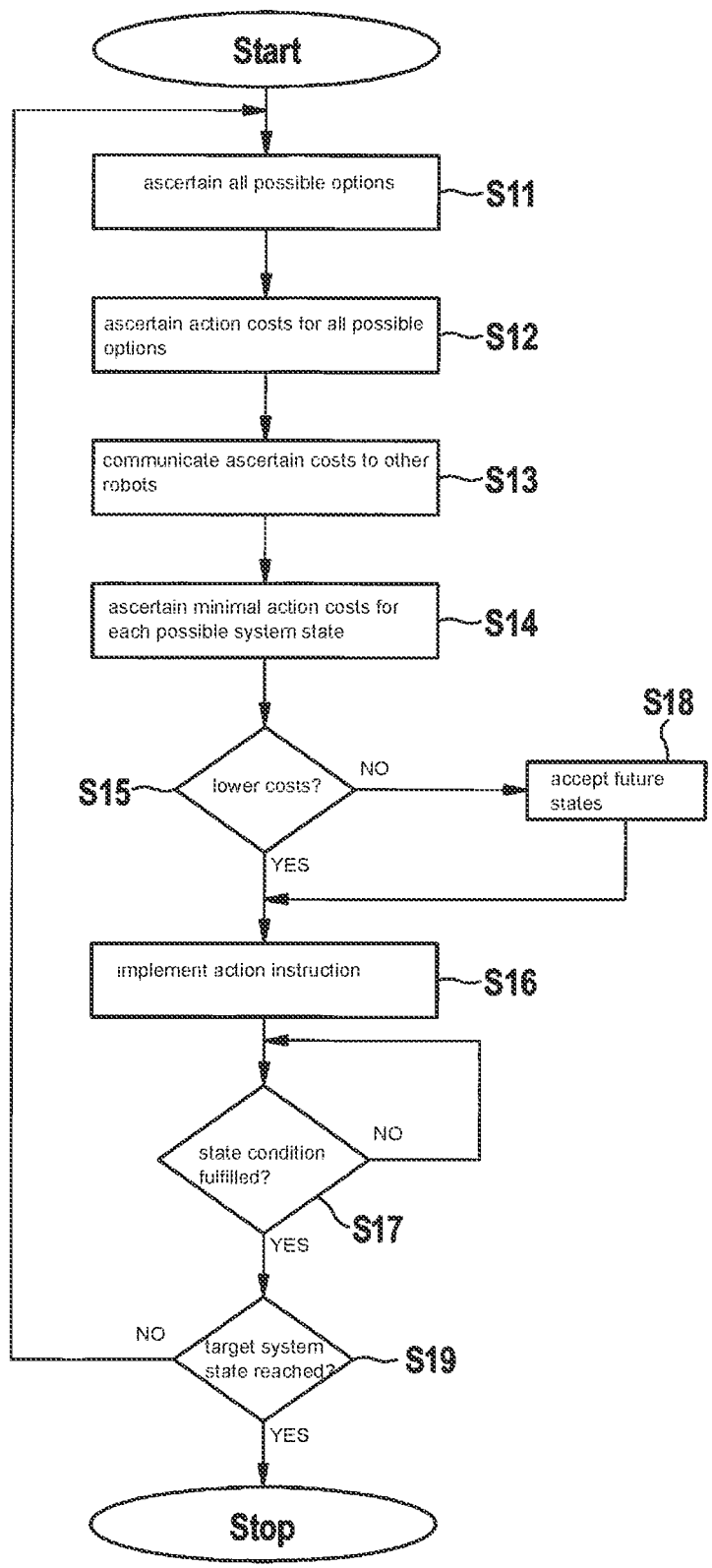
FIG. 4 shows a flow chart for illustrating a method for operating the multi-agent system for solving a task specification of existing tasks.

Prerequisite for the method for operating the multi-agent system is that each robot 1 is able to communicate with each of the other robots 1, and that the cyclical finite automaton DEA is introduced to each robot 1. The following method, which is described in connection with FIG. 4, describes the sequence in one of robots 1, the method being carried out essentially in parallel in each of robots 1.

In step S11, starting from the instantaneous state in the deterministic finite automaton, in particular, in the first run-through starting from start state 11, all possible options are initially ascertained. The options (represented as state transitions from a set (instantaneous) system state/robot state to a possible following system state/robot state) represent possibilities for reaching a next possible system state of the deterministic finite automaton.

Action costs AK are then ascertained in step S12 for all possible options ascertained in step S11. Action costs AK may, for example, be a function of a period of time D for carrying out the respective option for relevant robot 1. Action costs AK may also take probabilities into consideration in a system surroundings evidenced by uncertainties. The probabilities indicate in each case a probability, with which the state condition for the subsequent system state is fulfilled when the relevant option is carried out by relevant robot 1. For the direct costs K:K=D(s)*p(s) is applicable (with D(s) being the estimated period of time for carrying out the option under the condition that the implementation ends in a physical state s, and p being the probability of the fulfillment of the state condition of the relevant option in this state s, added up across all states s). Costs K may also take the costs into consideration which have already been assigned to other robots of the system.

An experience parameter V where AK=K+V, is also taken into consideration in the calculation of action costs AK for one option. When carrying out an option, experience parameter V enables previous costs to be taken into consideration as an experience value, through which direct costs K of the action defined by the relevant option may be corrected.

The case of the cyclical finite automaton makes it possible that by observing previously implemented state transitions between identical instantaneous and subsequent system states (i.e. between identical state transitions), the costs for carrying out an option by a particular robot 1 may be better estimated. Experience parameter V is taken into consideration, in particular, by assigning to each system state a value of an experience parameter V, which indicates how advantageous it is to switch to the particular system state.

The determination of experience parameter V is described in greater detail below.

In step S13, the costs thus ascertained are then communicated to all other robots 1 for each of the possible options of relevant robot 1. Thus, pieces of information about the costs for each of the options are available in all robots 1.

In step 14, the minimal action costs are then ascertained for each possible system state, which is reachable by one of the options ascertained itself or obtained by other robots 1.

It is subsequently checked in step S15 in each of robots 1 whether the intrinsic costs represent the lowest costs over all provided costs for an intermediate state reachable by one option. If this is the case (alternative: yes), then relevant robot 1 (which established this) is assigned the relevant option (with the lowest costs) and converted into an action instruction for reaching the system state specified by the option. The method is subsequently continued with step S16.

In step S16, the implementation of the action instruction is accordingly immediately begun.

In step S17, it is checked in each robot 1, whether the state condition has been fulfilled by its own action or whether a corresponding piece of information has been received regarding a fulfillment of a state condition by another robot 1. If this is not the case (alternative: no), a jump is made back to step 17, otherwise (alternative: yes), a jump is made to step S19.

In step S19, it is checked whether a defined target system state, which indicates, for example, an abortion condition, has been reached. If this is the case (alternative. yes), the method is terminated. Otherwise, a jump is made back to step S11.

If in step S15 it is established for each of the options that none of the options may be carried out with the lowest costs (alternative: no), the method is continued with step S18.

In the case of identical minimal costs, multiple robots 1 may potentially select one of the options simultaneously and may simultaneously carry out the corresponding action instruction. With the assignment process, each robot 1 is either assigned an option, according to which the robot is able to carry out an action instruction, or it remains inactive.

In step S18, robots 1 may accept future states during the auction, in order to plan action instructions they may pursue in order to prepare future parts of the task. This should take place by ensuring that the pursuit of these action instructions does not inhibit or violate the implementation of the subtasks of the instantaneous options. Thus, additional options that do not include the result of the carried out option as a precondition are taken into consideration for distributing options to non-assigned robots 1.

Due to the uncertainty of the surroundings, it is not clear beforehand how the implementation of the subtasks will continue. Robots 1 may therefore update their action instructions during implementation in two ways:
1. When the option of a robot 1 is terminated, the instantaneous state of each additional robot 1 is updated. Since the state of each robot 1 is changed as a result, the action instruction previously carried out is interrupted.
2. Knowledge that is collected by robots 1 during implementation is taken into consideration. In this way, the event probabilities, which indicate that a particular event may be observed, are adapted. These updated probabilities are communicated to each robot 1 and taken into consideration when ascertaining the costs of the individual options.

During implementation of the task, each robot 1 carries out the method cyclically, the shared system state of the cyclical finite automaton as well as the intrinsic robot state being noted. Starting from these states, each of robots 1 carries out the above described method in order to determine the next option. Since only the first assigned option may be carried out and no option that assumes a progress to be expected violates the LTL task in the instantaneous state, so-called wait actions are added. In this case, it is checked for each possible action according to the action instruction to be followed whether one of the target states violates a loop condition of the instantaneous system state. The loop condition defines valid rules or safety regulations in the respective system state. If this is the case, the respective action is replaced by a wait action, which ensures that relevant robot 1 remains in the respective state and is thus unable to violate the loop conditions.

Each robot 1 then carries out its option by following the established action instructions. If first robot 1 reaches a target state, an interrupt signal is sent to all other robots 1 in order to abort their instantaneous action. At the same time, the system state of next iteration $q_{k+1}$ is set to target state q' of the respective option and synchronized among the robots 1.

The system state is set to start state 11 whenever a target state 13 is reached, in particular, when using the cyclical finite automaton.

Experience parameter V is updated according to the following calculation, duration $d_k$ being determined by measuring the period of time that was required for carrying out iteration k.

For this purpose, experience parameter V and the Q-function are divided among robots 1 and each is updated by that robot 1 which completes its action of an assigned option to be carried out. For this purpose, the corresponding pieces of information are conveyed between robots 1.

The option assignment is carried out again after an interrupt and the next options are selected. This coordination allows robots 1 to note stochastic dynamics and to adapt their task assignment as needed.

Below is a description of how experience parameter V is ascertained.

In the above auction process, each robot 1 calculates for all available options costs K, in particular, in the form of implementation period of time d, and experience parameter V of the target state of the action assigned to the relevant option. Implementation period of time d corresponds to a period of time which, for carrying out the option, is expected in order, starting with the instantaneous robot state, to reach a final state of the relevant option, however, the stochasticity of the physical system state is not represented in a system that includes multiple robots. This arises from the fact that when actions specified by the options are simultaneously carried out by different robots, the robots may be in the midst of carrying out actions when one of the robots reaches a target state, which are then immediately terminated or interrupted. Due to the resultant undetermined intermediate states of these other robots 1, it is possible to only imprecisely determine action costs for their next actions of a subsequent auction.

Thus, the option with the lowest costs may only be ascertained by an estimated consideration of experience parameter V, if the stochasticity is to be taken into consideration. Experience parameter V is a function of the distribution of the physical start states of relevant robots 1 when the action to be carried out by the option starts.

The distribution is represented by the observed start states during the repeated implementations of the task, and experience parameter V may therefore represent the long-term costs across the logical states. As a result, each target state of an option may be ascertained by solving a shortest path problem.

The duration for carrying out a transition in the cyclical finite automaton therefore corresponds to the duration of an option o having the expected value $$\bar{d}_o = \mathbb{E}\,[d_o^r(s')].$$

The Bellman equation for this shortest path problem corresponds to $$V^*(q) = \min_{o \in O(q)} (\bar{d}_0 + V^*(q'))$$

with the boundary conditions V*(q)=0 and q' corresponding to the logic target state of option o, O(q) indicating the set of possible options starting from a system state of the cyclical finite automaton. In this approach, the durations $\bar{d}_0$ are unknown, and V* may be ascertained only by observing the period of implementation $d_0^r$ of actions actually carried out.

With the aid of a Q-function, which represents the approximate experience costs when carrying out an action specified by option o in system state q, it is possible to derive an estimated experience parameter $V_k$ for iteration k from $$V_k(q) = \min_{o \in O(q)} Q_k(q, 0)$$

for all system states of the cyclical finite automaton and for options available in the system state.

Thus, whenever terminating the action associated with an option, the costs or the period for carrying out the action are ascertained by the relevant robot and the Q-function corresponding to $$Q_{k+1}(q,0) = Q_k(q,0) + a_k[d_k + V_k(q') - Q_k(q,0)]$$

is updated. $a_k$ corresponds to an adaptation parameter, which may decrease for higher k.

Figure 5:
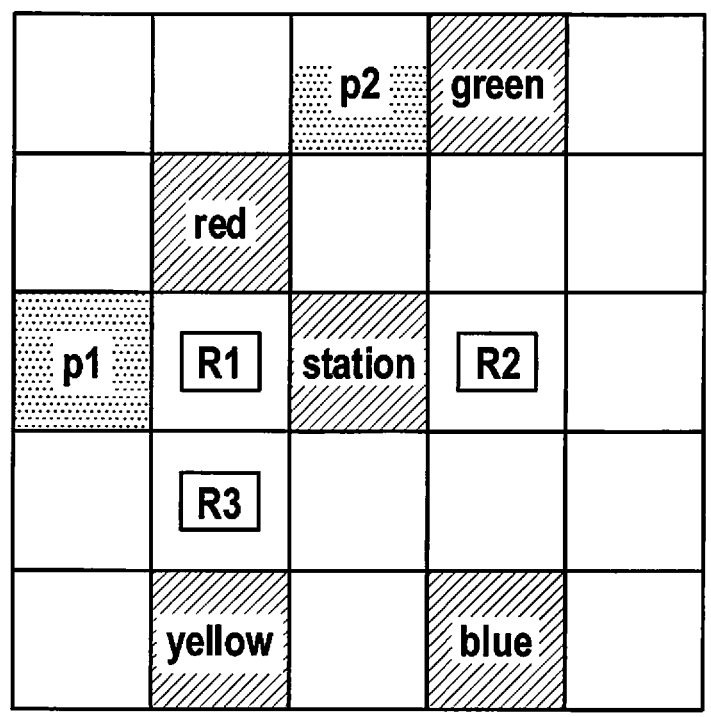
FIG. 5 shows an example of a multi-agent system, including two mobile robots situated in system surroundings.

FIG. 5 depicts an example of a scenario of a multi-agent system, to which the previously described method is advantageously applicable. In the multi-agent system, mobile robots R1, R2, R3 are intended to carry out a task. The objective is to carry out the following target specifications on the map depicted in FIG. 5, which depicts a set of target positions with different labels 'red', 'blue', 'yellow' and 'green':

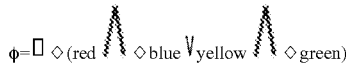

The objective may be fulfilled either by delivery to the target position 'red' and then to the target position 'blue' or first to the target position 'yellow' and then to the target position 'green'. The objects to be delivered may be received by positions p1 and p2. A robot may also be damaged if it carries out a delivery and if it is damaged, no additional object may be received. A damaged robot 1 may be repaired in the position 'station'.

Due to the decentralized approach of the auction assignment, the above method may be applied to multi-agent systems that include an arbitrary number of robots 1, and the implementation time of the mission may be reduced by adding additional robots 1.

What is claimed is:

1. A method for operating a multi-agent system, which includes a plurality of robots, the method comprising:
   each robot of the robots being configured and provided to cyclically carry out the following:
      ascertaining, starting from an instantaneous system state, possible options, the possible options defining actions by which a transition may be achieved from the instantaneous system state to a subsequent system state;
      ascertaining, for each of the possible options, action costs for carrying out the action defined by the option;
      carrying out an auction, the action costs ascertained for each option being taken into consideration by each of the other robots; and
      carrying out an action, which corresponds to one of the possible options, as a function of all action costs ascertained or received for the relevant option;
      wherein the action costs for each particular option of the possible options each taking an ascertained experience parameter into consideration, which is a function of costs previously incurred for the action defined by the particular option previously carried out by the robots in previous cycles, the experience parameter being ascertained as a function of time durations of the previously carried out action in the previous cycles.

2. The method of claim 1, wherein an action is carried out, which corresponds to one of the options if an intrinsic cost value is ascertained for the corresponding option, which indicates the lowest costs of all cost values received for the corresponding option.

3. The method of claim 1, wherein no action is carried out that corresponds to one of the options if no intrinsic cost value, which indicates the lowest costs of all action costs received for the corresponding option is ascertained for any of the options.

4. The method of claim 1, wherein the experience parameter is a function of the distribution of the physical start states of the relevant robots when the action to be carried out by the option is started.

5. The method of claim 1, wherein the experience parameter is ascertained by solving a shortest path problem.

6. The method of claim 1, wherein the experience parameter is updated when terminating the action associated with an option by ascertaining the costs for carrying out the action by the relevant robot and by adapting the experience parameter as a function of the ascertained costs and, in particular, as a function of an adaptation parameter, which decreases, in particular, for higher k.

7. The method of claim 1, wherein the action costs for an option is a function of a period of time for carrying out the action assigned to the option and/or is a function of a probability that when carrying out the action assigned to the option, a state condition for reaching the system state to which the option leads, is ascertained.

8. The method of claim 7, wherein a probability that when an action assigned to an option is carried out, a state condition for reaching the system state is reached, is updated as the action is carried out.

9. The method of claim 1, wherein if an action is terminated, the system state reached is conveyed to the other robots.

10. The method of claim 1, wherein an implementation of an action is interrupted or terminated if a piece of information about reaching a subsequent system state is received.

11. The method of claim 1, wherein the action costs ascertained for each option are provided via explicit communication of costs by each of the other robots.

12. A robot for operating a multi-agent system including a plurality of robots, comprising:
   a robot device configured to cyclically perform the following:
      starting from an instantaneous system state, ascertaining possible options, the possible options defining actions by which a transition from the instantaneous system state to a subsequent system state is achievable;
      for each of the possible options, ascertaining action costs for carrying out the action defined by the option;
      carrying out an auction, the action costs ascertained for each option being taken into consideration by each of the other robots; and
      carrying out an action that corresponds to one of the possible options, as a function of all action costs ascertained and received for the relevant option;
      wherein the action costs for each particular option of the possible options each taking an ascertained experience parameter into consideration, which is a function of costs previously incurred for the action defined by the particular option previously carried out by multiple robots of the multi-agent system in previous cycles, the experience parameter being ascertained as a function of time durations of the previously carried out action in the previous cycles.

13. A multi-agent system, comprising:
   a plurality of robots;
   wherein each robot of the robots is configured to cylically perform the following:
      starting from an instantaneous system state, ascertaining possible options, the possible options defining actions by which a transition from the instantaneous system state to a subsequent system state is achievable;

for each of the possible options, ascertaining action costs for carrying out the action defined by the option;

carrying out an auction, the action costs ascertained for each option being taken into consideration by each of the other robots; and carrying out an action that corresponds to one of the possible options, as a function of all action costs ascertained and received for the relevant option;

wherein the action costs for each particular option of the possible options each taking an ascertained experience parameter into consideration, which is a function of costs previously incurred for the action defined by the particular option previously carried out by multiple robots of the multi-agent system in previous cycles, the experience parameter being ascertained as a function of time durations of the previously carried out action in the previous cycles.

14. A non-transitory computer readable medium having a computer program, which is executable by a processor, the computer program including program code for operating a robot in a multi-agent system, which includes a plurality of robots, the program code, when executed by the processor, causing the processor to cyclically carry out the following:

ascertaining, starting from an instantaneous system state, possible options, the possible options defining actions by which a transition may be achieved from the instantaneous system state to a subsequent system state;

ascertaining, for each of the possible options, action costs for carrying out the action defined by the option;

carrying out an auction, the action costs ascertained for each option being taken into consideration by each of the other robots; and carrying out an action, which corresponds to one of the possible options, as a function of all action costs ascertained or received for the relevant option;

wherein the action costs for each particular option of the possible options each taking an experience parameter into consideration, which is a function of costs previously incurred for the action defined by the particular option previously carried out by the robots in previously cycles, the experience parameter being ascertained as a function of time durations of the previously carried out action in the previously cycles.

15. The computer readable medium of claim 14, wherein an action is carried out, which corresponds to one of the options if an intrinsic cost value is ascertained for the corresponding option, which indicates the lowest costs of all cost values received for the corresponding option.

* * * * *